US012714624B2

(12) United States Patent
Park et al.

(10) Patent No.: US 12,714,624 B2
(45) Date of Patent: Aug. 25, 2026

(54) CERVICAL VERTEBRA AND THORACIC VERTEBRA TRACTION STRUCTURE AND CERVICAL VERTEBRA AND THORACIC VERTEBRA CORRECTING APPARATUS HAVING THE SAME

(71) Applicant: spine & jointlab inc., Seoul (KR)

(72) Inventors: Jun-Kyu Park, Seoul (KR); Won Seok Yoo, San Francisco, CA (US)

(73) Assignee: SPINE & JOINTLAB INC., Seoul (KR)

( * ) Notice: Subject to any disclaimer, the term of this patent is extended or adjusted under 35 U.S.C. 154(b) by 0 days.

(21) Appl. No.: 18/946,639

(22) Filed: Nov. 13, 2024

(65) Prior Publication Data

US 2025/0152448 A1 May 15, 2025

(30) Foreign Application Priority Data

Nov. 14, 2023 (KR) ........................ 10-2023-0157298

(51) Int. Cl.
*A61H 1/02* (2006.01)

(52) U.S. Cl.
CPC ......... *A61H 1/0218* (2013.01); *A61H 1/0296* (2013.01)

(58) Field of Classification Search
CPC ............. A61F 5/05883; A61F 5/05891; A61H 1/0296; A61H 1/0292
See application file for complete search history.

(56) References Cited

U.S. PATENT DOCUMENTS 4,805,603 A * 2/1989 Cumberland ........ A61H 1/0218 128/DIG. 20
5,305,750 A * 4/1994 Makita ............. G01R 33/34046 128/845
5,713,841 A * 2/1998 Graham ............... A61H 1/0218 606/240
5,916,189 A * 6/1999 Sullenperger ....... A61F 5/05883 602/32
8,251,939 B2 * 8/2012 Aune ................... A61H 1/0296 602/18
8,303,626 B2 * 11/2012 Fischer ................... A61F 5/055 606/241
8,684,958 B1 * 4/2014 Lefkovitz ............... A61F 5/048 128/97.1

(Continued)

FOREIGN PATENT DOCUMENTS

KR 10-1021414 3/2011
KR 20-0458054 1/2012

(Continued)

*Primary Examiner* — Kari K Rodriquez
(74) *Attorney, Agent, or Firm* — KILE PARK REED & HOUTTEMAN PLLC

(57) ABSTRACT

A cervical and thoracic vertebra traction structure is provided, including a back support for the user's thoracic and cervical vertebrae, a head support for the back of the user's head, and a pivoting mechanism connecting both supports. The head support can rotate downward in an arc relative to the back support, allowing the neck's lower cervical vertebrae to rest on the back support and the upper cervical vertebrae on the head support. This design tilts the user's head backward, effectively stretching the cervical vertebrae by providing traction and support.

11 Claims, 10 Drawing Sheets

(56) References Cited

U.S. PATENT DOCUMENTS

| | | | | |
|---|---|---|---|---|
| 8,905,958 | B2 * | 12/2014 | Senyei | A61F 5/055<br>602/18 |
| 9,192,503 | B1 * | 11/2015 | Peterson | A61H 1/0296 |
| 10,363,193 | B2 * | 7/2019 | Graham | A61F 5/055 |
| 2015/0051529 | A1 * | 2/2015 | Marshall | A61H 1/0296<br>602/32 |

FOREIGN PATENT DOCUMENTS

| | | |
|---|---|---|
| KR | 10-1904016 | 10/2018 |
| KR | 10-2439512 | 9/2022 |

* cited by examiner

CERVICAL VERTEBRA AND THORACIC VERTEBRA TRACTION STRUCTURE AND CERVICAL VERTEBRA AND THORACIC VERTEBRA CORRECTING APPARATUS HAVING THE SAME

TECHNICAL FIELD

The present invention relates to a cervical vertebra and thoracic vertebra traction structure and a cervical vertebra and thoracic vertebra correcting apparatus having the same, and more particularly, to a cervical vertebra and thoracic vertebra traction structure in which, in a state in which a back part is supported by a back support and a head part is supported by a head support, the head support is pivotally rotated downward with respect to the back support while drawing a fan-shaped arc so that a thoracic vertebra and a cervical vertebra can be simultaneously pulled while having a C-shaped curve and thus a cervical vertebra and thoracic vertebra correcting effect can be maximized, and a cervical vertebra and thoracic vertebra correcting apparatus having the same.

BACKGROUND ART

In general, the spine is divided into the coccyx, sacrum, lumbar, thoracic, and cervical vertebrae. At this time, the thoracic vertebra positioned at the top of the spine supports a head having a weight of about 10 kg and distributes the load of the upper part of the body to maintain the upright structure of the human body without strain. To this end, the thoracic vertebra forms a loose semicircle (C-shape) with a normal curve angle of at about 40 degrees.

However, the thoracic vertebra having a C-shaped curve as described above has a large possibility that a straight neck or a cervical disc disease occurs when the C-shaped curve of the thoracic vertebra is deformed due to a bad posture by the long-term use of a smartphone and a computer and injury and thus, a thoracic vertebra correcting apparatus has been disclosed.

In a thoracic vertebra correcting apparatus according to the related art, a cylindrical thoracic vertebra support allows a user's thoracic vertebra to be stably supported so that the user gets a good night's sleep and the distorted user's thoracic vertebra's shape due to the user's bad posture is corrected so that the straight neck or the cervical disc disease can be effectively treated and corrected.

However, since in the thoracic vertebra correcting apparatus according to the related art, the user's neck part is supported by the cylindrical thoracic vertebra support with a constant diameter, when only the thoracic vertebra is pulled in a state in which the cervical vertebra is not pulled, soft tissues in the vicinity of the cervical vertebra and thoracic vertebra are not sufficiently relaxed, so that the correcting effect through traction may be lowered.

PRIOR-ART DOCUMENT (Patent document 0001) Korean Patent Registration No. 10-1021414

(Patent document 0002) Korean Utility-model Registration No. 20-0458054

(Patent document 0003) Korean Patent Registration No. 10-1904016

(Patent document 0004) Korean Patent Registration No. 10-2439512

DISCLOSURE OF THE INVENTION

The present invention provides a cervical vertebra and thoracic vertebra traction structure and a cervical vertebra and thoracic vertebra correcting apparatus having the same in which, in a state in which a back support is supported by a back support and a head part is supported by a head support, the head support is pivotally rotated downward with respect to the back support while drawing a fan-shaped arc so that a thoracic vertebra and a cervical vertebra can be simultaneously pulled while having a C-shaped curve and thus a cervical vertebra and thoracic vertebra correcting effect can be maximized.

Meanwhile, the objectives of the present invention is not limited to the objectives mentioned above, and other objectives not mentioned will be clearly understood by those skilled in the art from the description below.

According to an aspect of the present invention, there is provided a cervical vertebra and thoracic vertebra traction structure including: a back support on which a user's back part is seated and which allows the user's thoracic vertebra and cervical vertebra to be supported; a head support on which a back of the user's head is seated and which allows the back of the user's head and the cervical vertebra to be supported; and a pivot rotating portion which is configured at a connection part of the back support and the head support, allows the head support to be pivotally rotated downward with respect to the back support while drawing a fan-shaped arc so that, when the back of the user's neck is seated at the connection part of the back support and the head support, lower cervical vertebrae are supported by the back support and upper cervical vertebrae are supported by the head support and thus the cervical vertebrae are pulled through a movement in which the back of the user's head is tilted toward a floor.

The cervical vertebra and thoracic vertebra traction structure may further include a return portion which is configured at the connection part of the back support and the head support and allows the head support pivotally rotated with respect to the back support to be returned to it's original position.

The back support may include a backrest on which the user's back part is seated; a back slope which corresponds to an upper surface of the backrest and provides a certain slope from a lower part to an upper part of the backrest so that the upper thoracic vertebrae of the user supported by the backrest are in a higher position than the lower thoracic vertebrae; a lower cervical support which protrudes at a predetermined height from the upper part of the backrest and allows the back of the user's neck to be seated on the backrest when the user's back part is seated on the backrest, thereby supporting the user's cervical vertebra; and a lower cervical traction groove which is formed in a grooved structure in a center of the lower cervical support, allows the user's cervical vertebra to be stably supported and allows the lower cervical vertebrae to be pulled when the head support is pivotally rotated downward.

The back support may further include: a thoracic airbag seating groove which is formed in a grooved structure in the back support and allows a thoracic airbag to be positioned; and a first cervical airbag seating groove which is formed in a grooved structure on the other surface of the lower cervical support facing the slope of the lower cervical support and allows a cervical airbag to be positioned.

The head support may include: a headrest on which the user's head part is seated; a head slope which corresponds to an upper surface of the headrest and provides a certain slope from a lower part to a n upper part of the headrest so that a lower part of the back of the user's head supported by the headrest is in a higher position than the upper part of the back of the user's head; an upper cervical support which protrudes at a predetermined height with respect to the head slope from the upper part of the headrest and allows the back of the user's neck to be seated on the headrest when the back of the user's head is seated on the headrest, thereby supporting the user's cervical vertebra; and an upper cervical traction groove which is formed in a grooved structure in a center of the upper cervical support, allows the user's cervical vertebra to be supported and allows the upper cervical vertebrae to be pulled when the headrest is pivotally rotated downward with respect to the backrest.

The head support may further include: a head seating groove that allows a left part and a right part of the head slope to be in a higher position than the center and thus allows the back of the user's head seated on the headrest to be stably seated; a stepped space recessed portion which is formed so that a lower surface of the headrest has a stepped space and allows the lower surface of the headrest to be in a higher position than the lower surface of the upper cervical support and thus the headrest can be pivotally rotated downward with respect to the backrest; a band fastening hole which is configured in the headrest corresponding to both sides of the head seating groove, allows a band worn on the user's forehead with the back of the head seated in the head seating groove to be fixed and allows the back of the user's head not to be deviated from the head seating groove when the headrest is pivotally rotated downward with respect to the backrest; and a second cervical airbag seating groove which is formed in a grooved structure on the upper cervical support and allows the cervical airbag to be positioned.

According to another aspect of the present invention, there is provided a cervical vertebra and thoracic vertebra correcting apparatus including: the cervical vertebra and thoracic vertebra traction structure described above; a cervical traction unit which is configured between the back support and the head support and allows the head support to be pivotally rotated downward with respect to the back support through the pivot rotating portion so that the user's cervical part can be pulled, and a thoracic traction unit which is configured in the back support, presses the user's back part seated on the back support, allows the user's chest to be tilted toward the floor so that the thoracic vertebrae can be pulled.

The cervical tracing unit may include: a cervical airbag positioned between the back support and the head support; and an air regulator which supplies air to the cervical airbag or discharges the supplied air.

The thoracic tracing unit may further include: a thoracic airbag positioned in the back support; and an air regulator which supplies air to the thoracic airbag or discharges the supplied air.

EFFECT OF THE INVENTION

Thus, according to the present invention, in a state in which a back part is supported by a back support and a head part is supported by a head support, the head support is pivotally rotated downward with respect to the back support while drawing a fan-shaped arc so that a thoracic vertebra and a cervical vertebra can be simultaneously pulled while having a C-shaped curve and thus a cervical vertebra and thoracic vertebra correcting effect can be maximized.

Meanwhile, the effects of the present invention are not limited to the effects mentioned above, and other effects not mentioned will be clearly understood by those skilled in the art from the description of the claims.

DETAILED DESCRIPTION FOR CARRYING OUT THE INVENTION

Hereinafter, embodiments of the present invention will be described in detail with reference to the accompanying drawings.

Figure 1:
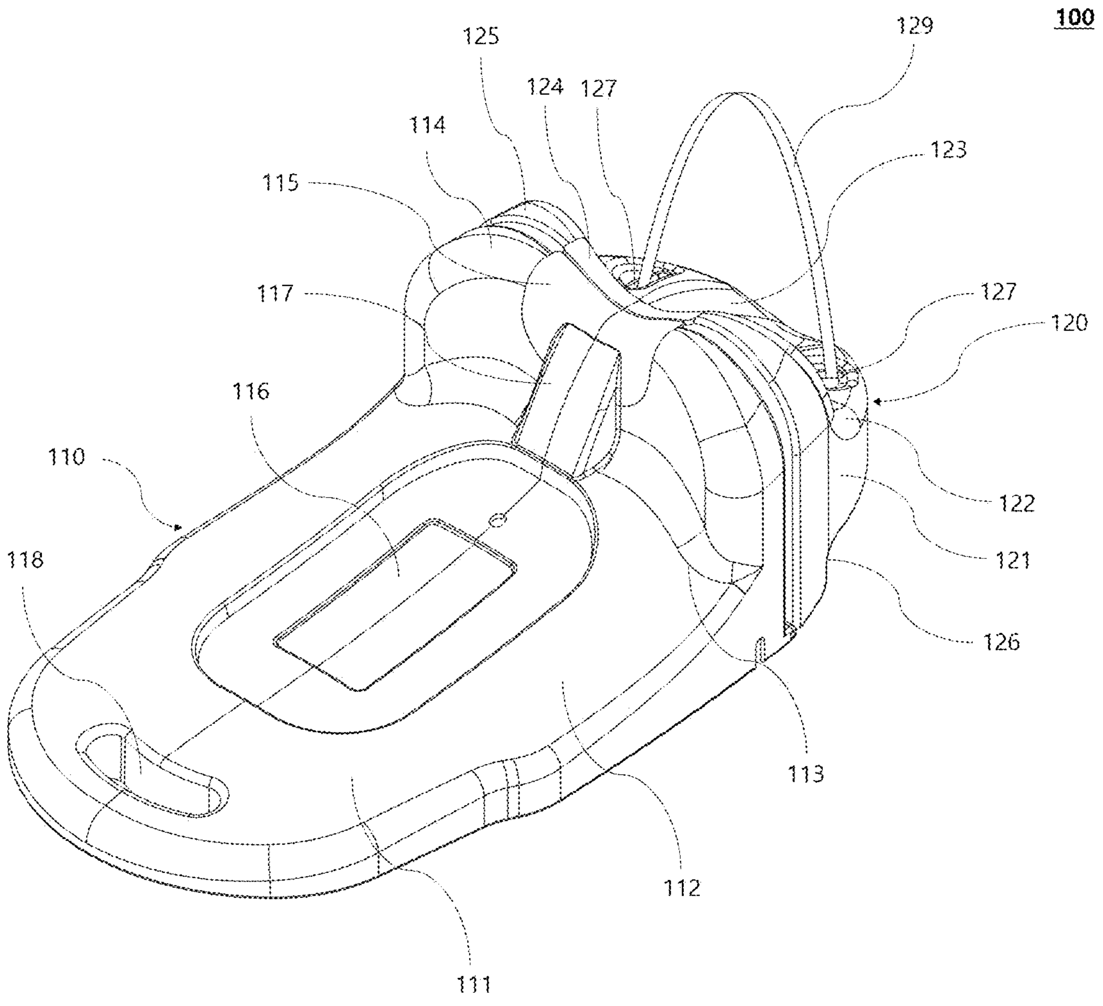
FIGS. 1 and 2 are respectively a front perspective view and a rear perspective view illustrating a cervical vertebra and thoracic vertebra traction structure according to an embodiment of the present invention.
Figure 2:
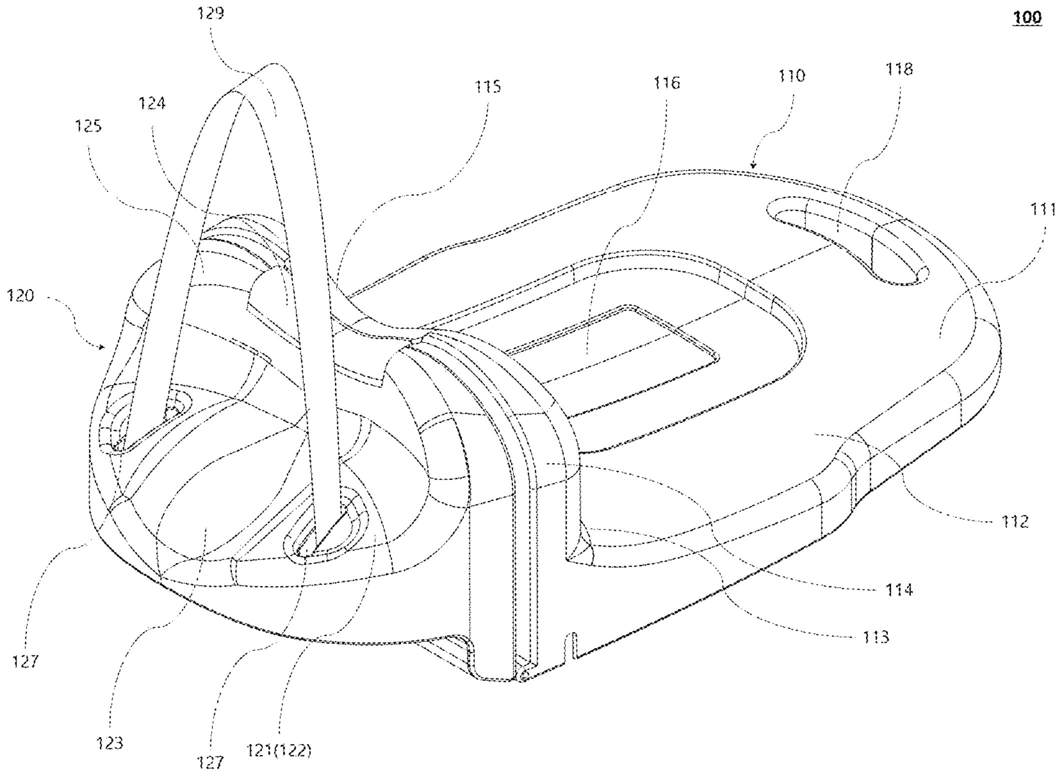
Figure 3:
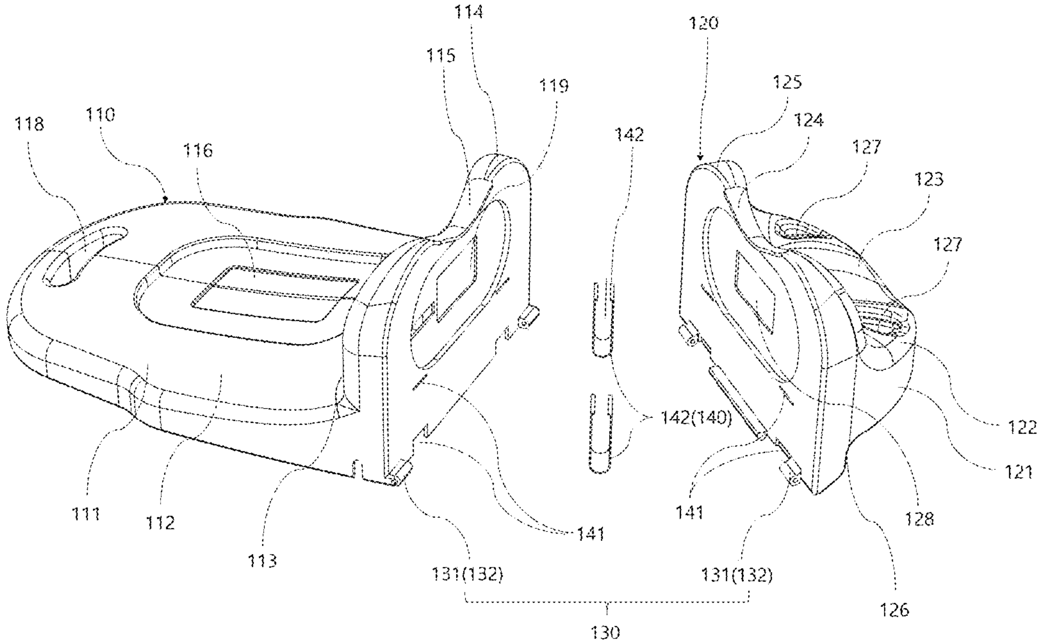
FIG. 3 is an exploded perspective view illustrating the cervical vertebra and thoracic vertebra traction structure of FIG. 1.
Figure 4:
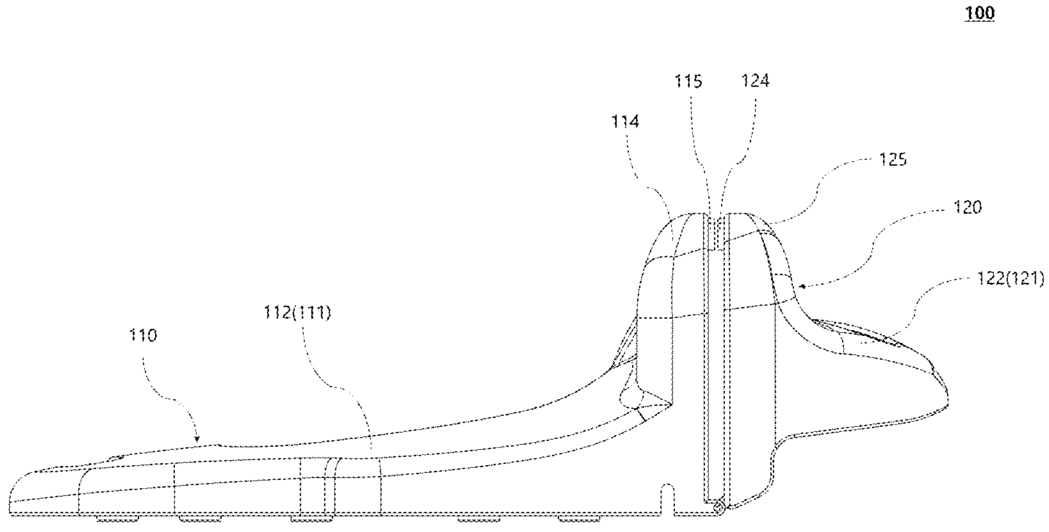
FIGS. 4 and 5 are respectively side views illustrating the function of the cervical vertebra and thoracic vertebra traction structure of FIG. 1.
Figure 5:
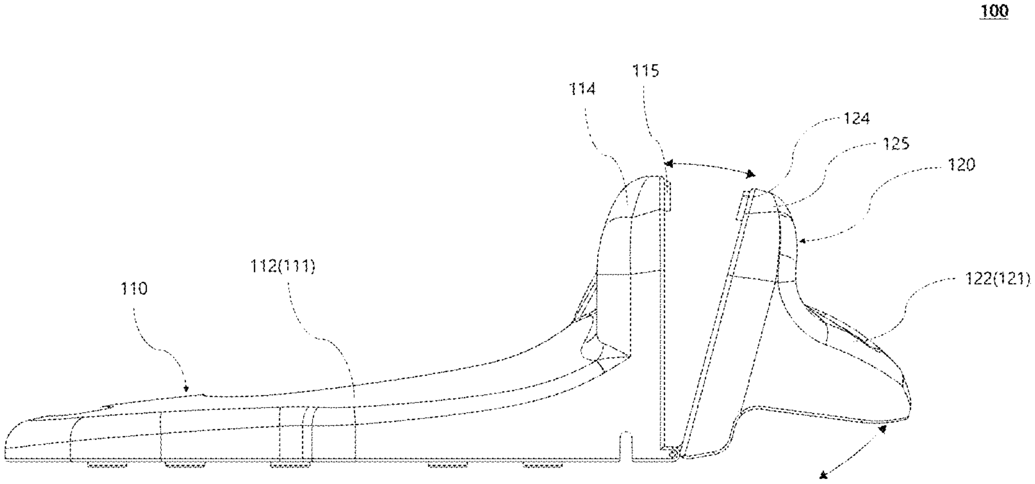
Figure 6:
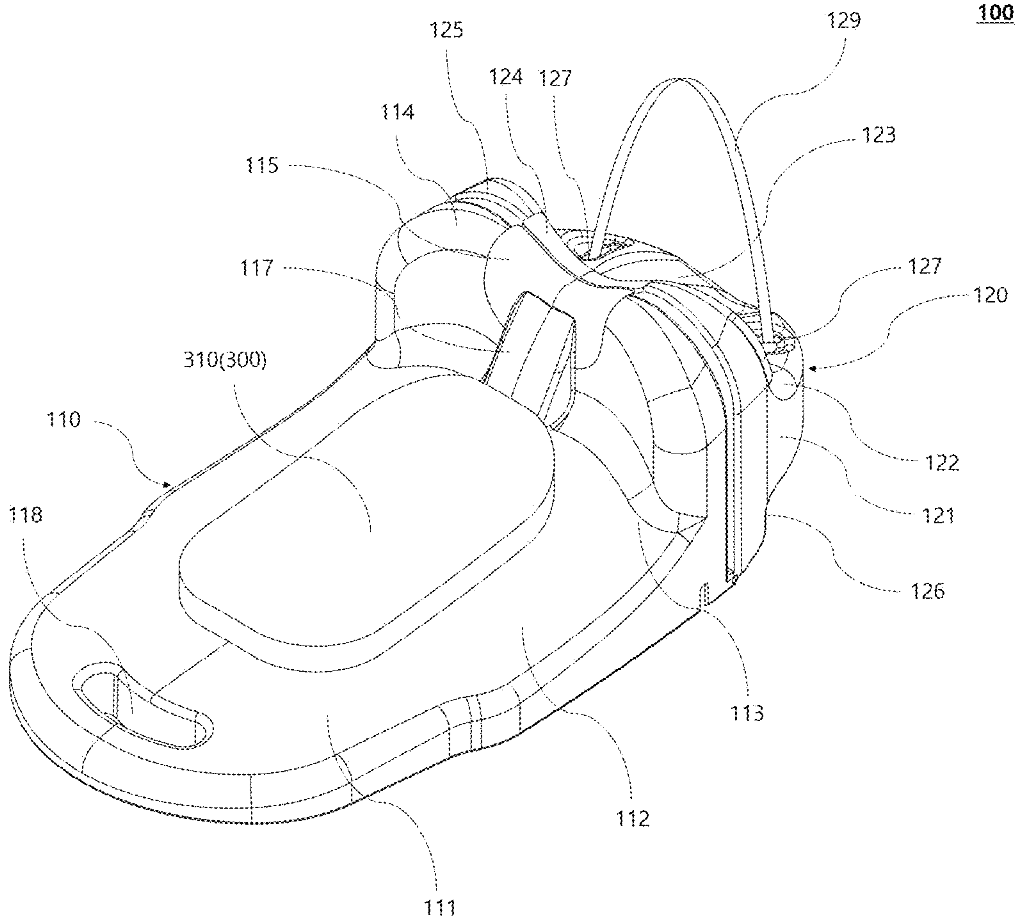
FIGS. 6 and 7 are respectively a front perspective view and a rear perspective view illustrating a cervical vertebra and thoracic vertebra correcting apparatus having the cervical vertebra and thoracic vertebra traction structure of FIG. 1.
Figure 7:
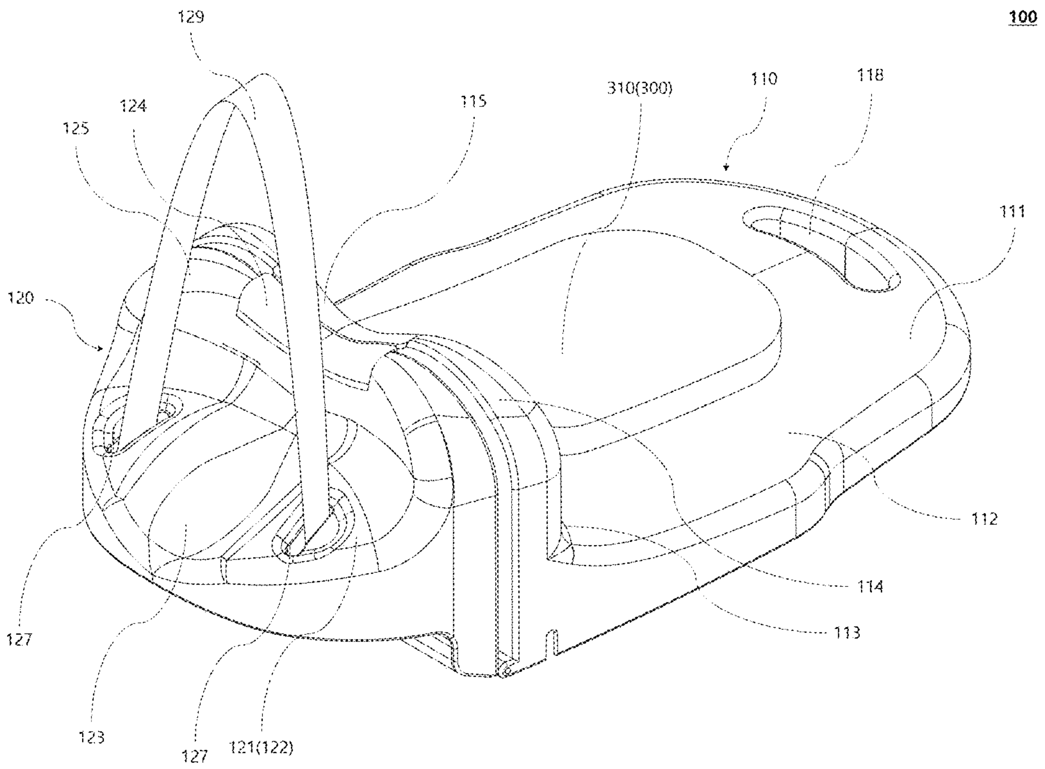
Figure 8:
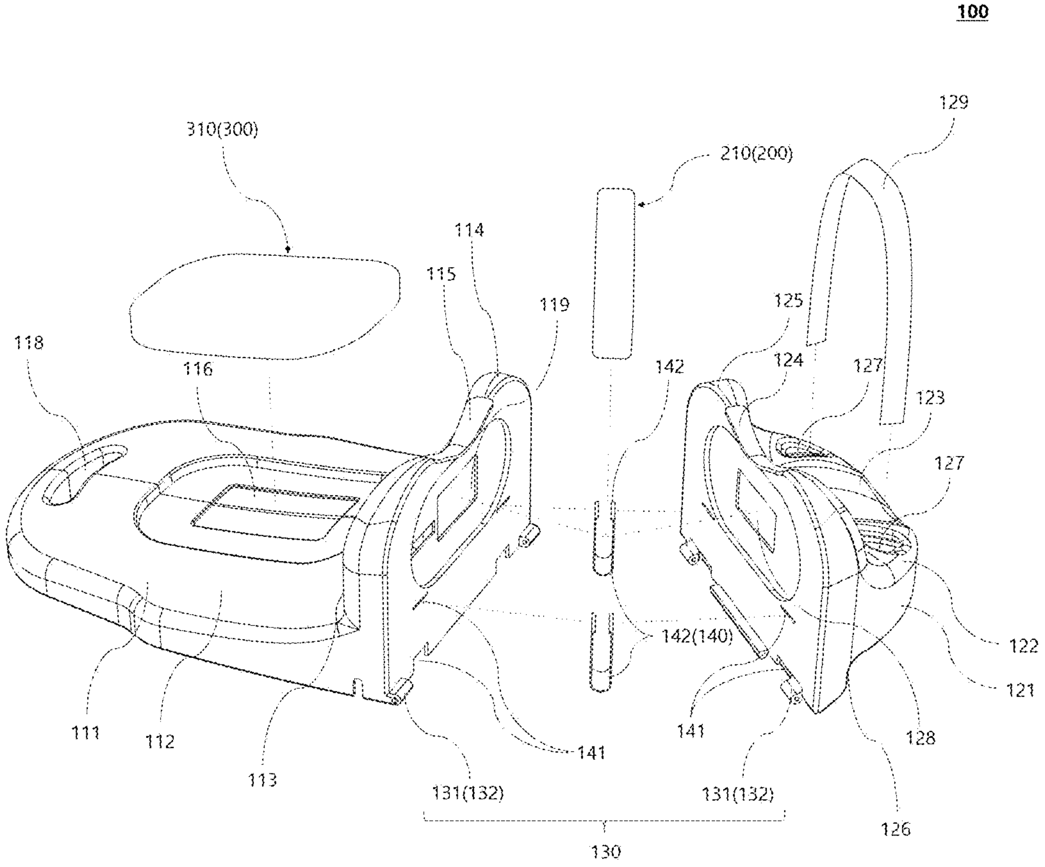
FIG. 8 is an exploded perspective view illustrating the cervical vertebra and thoracic vertebra correcting apparatus of FIG. 6.
Figure 9:
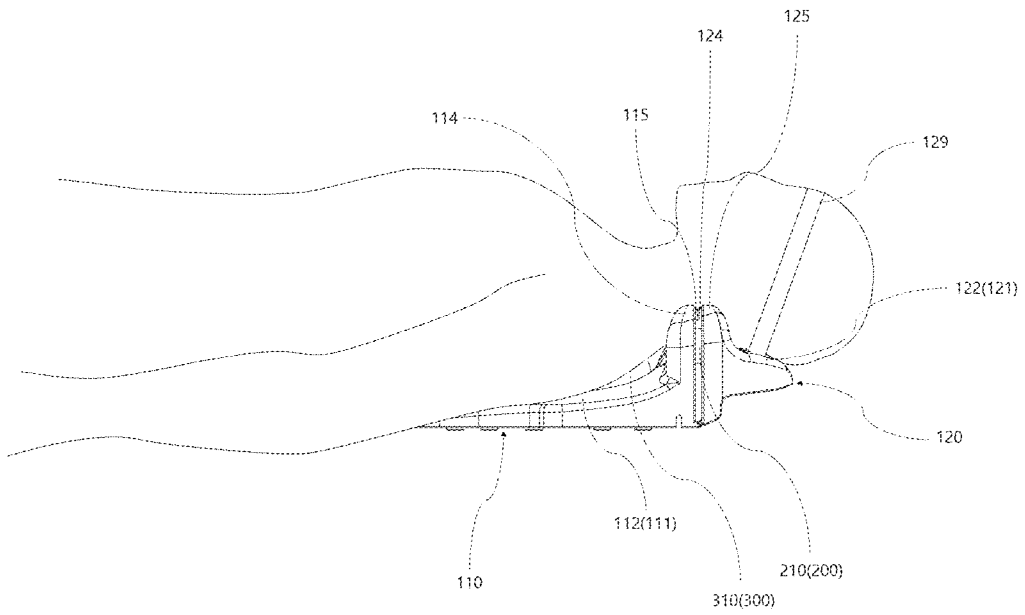
FIGS. 9 and 10 are respectively side views illustrating the function of the cervical vertebra and thoracic vertebra correcting apparatus of FIG. 6.
Figure 10:
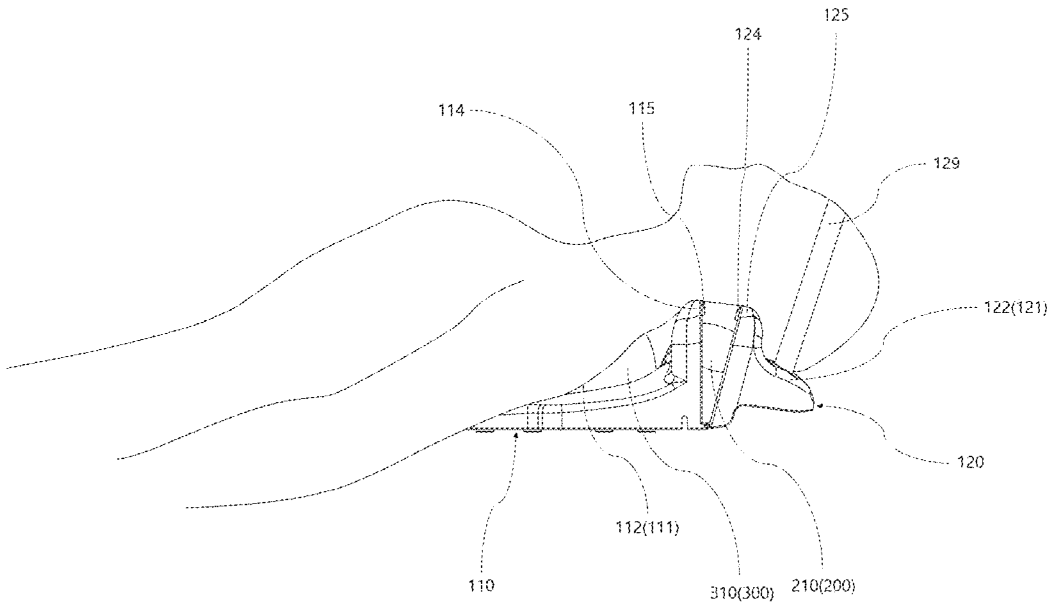

As illustrated in FIGS. 1 through 10, a cervical vertebra and thoracic vertebra traction structure 100 according to an embodiment of the present invention includes a back support 110 on which a user's back part is seated and which allows the user's thoracic vertebra and cervical vertebra to be supported, a head support 120 on which the back of the user's head is seated and which allows the back of the user's head and thoracic vertebra to be supported, a pivot rotating portion 130 which is configured at a connection part of the back support 110 and the head support 120, allows the head support 120 to be pivotally rotated downward with respect to the back support 110 while drawing a fan-shaped arc so that, when the back of the user's neck is seated at the connection part of the back support 110 and the head support 120, the lower cervical vertebrae (6th to 7th) are supported by the back support 110 and the upper cervical vertebrae (1st to 2nd) are supported by the head support 120 and thus the cervical vertebrae are pulled through a movement in which the back of the user's head is tilted toward the floor, and a return portion 140 which is configured at the connection part of the back support 110 and the head support 120 and allows the head support 120 pivotally rotated with respect to the back support 110 to be returned to it's original position.

The back support 110 as a unit on which the user's back part is seated and which allows the user's thoracic vertebra and cervical vertebra to be supported, includes a backrest 111 on which the user's back part is seated, a back slope 112 which corresponds to the upper surface of the backrest 111 and provides a certain slope from the lower part to the upper part of the backrest 111 so that the upper thoracic vertebrae (1st to 3rd) of the user supported by the backrest 111 are in a higher position than the lower thoracic vertebrae (9th to 12th), a relaxation round 113 which allows the left and right sides of the backrest 112 to be lower than the center, allows the user's shoulder part seated on the backrest 111 to be relaxed and thus allows the user's thoracic vertebra to maintain a C-shape, a lower cervical support 114 which protrudes at a predetermined height from the upper part of the backrest 111 and allows the back of the user's neck to be seated on the backrest 111 when the user's back part is seated on the backrest 111, thereby supporting the user's cervical vertebra, a lower cervical traction groove 115 which is formed in a grooved structure in the center of the lower cervical support 114, allows the user's cervical vertebra to be stably supported and allows the lower cervical vertebrae (6th and 7th) to be pulled when the head support 120 is pivotally rotated downward, a thoracic airbag seating groove 116 which is formed in a grooved structure in the back support 110 and allows a thoracic airbag 310 to be described later to be stably positioned, a slope 117 which is installed on one surface of the lower thoracic support 114 corresponding to the lower cervical traction groove 115 from the thoracic airbag seating groove 116 to have a predetermined inclination and allows the upper thoracic vertebrae (1st to 3rd) to be supported, a gripper hole 118 which is formed at the lower part of the backrest 111 and allows the backrest 111 to be gripped while the backrest 111 is moved, and a first cervical airbag seating groove 119 which is formed in a grooved structure on the other surface of the lower cervical support 114 facing the slope 117 of the lower cervical support 114 and allows a cervical airbag 210 to be described later to be stably positioned.

Thus, according to the back support 110, when the user's back part is seated on the backrest 111, the user's thoracic or lumbar part is supported on the back slope 112, and the user's cervical vertebra is supported by the lower cervical support 114, and in this case, the relaxation round 113 allows the user's chest to be tilted toward the floor, and the thoracic vertebra is relaxed, and the relaxation round 113 may be curved with a C-shaped curve.

The head support 120 as a unit on which the user's head part is seated and which allows the back of the user's head and cervical vertebra to be supported, includes a headrest 121 on which the user's head part is seated, a head slope 122 which corresponds to the upper surface of the headrest 121 and provides a certain slope from the lower part to the upper part of the headrest 121 so that the lower part of the back of the user's head supported by the headrest 121 is in a higher position than the upper part of the back of the user's head, a head seating groove 123 that allows the left part and the right part of the head slope 122 to be in a higher position than the center and thus allows the back of the user's head seated on the headrest 121 to be stably seated, an upper cervical support 124 which protrudes at a predetermined height with respect to the head slope 122 and the head seating groove 123 from the upper part of the headrest 121 and allows the back of the user's neck to be seated on the headrest 121 when the back of the user's head is seated on the headrest 111, thereby supporting the user's cervical vertebra, an upper cervical traction groove 125 which is formed in a grooved structure in the center of the upper cervical support 124, allows the user's cervical vertebra to be stably supported and allows the upper cervical vertebrae (1st and 2nd) to be pulled when the headrest 121 is pivotally rotated downward with respect to the backrest 111, a stepped space recessed portion 126 which is formed so that the lower surface of the headrest 121 has a stepped space and allows the lower surface of the headrest 121 to be in a higher position than the lower surface of the upper cervical support 124 and thus the headrest 121 can be pivotally rotated downward with respect to the backrest 111, a band fastening hole 127 which is configured in the headrest 121 corresponding to both sides of the head seating groove 123, allows a band 129 worn on the user's forehead with the back of the head seated in the head seating groove 123 to be fixed and allows the back of the user's head not to be deviated from the head seating groove 123 when the headrest 121 is pivotally rotated downward with respect to the backrest 111, and a second cervical airbag seating groove 128 which is formed in a grooved structure on one surface of the upper cervical support 124 facing the lower cervical support 114 and allows the cervical airbag 210 to be described later to be stably positioned.

Thus, according to the head support 120, when the back of the user's head is seated on the headrest 121, the back of the user's head is supported on the head slope 122, and the user's cervical vertebra is supported by the upper cervical support 124, and in this case, the band 129 allows the user's head part to be fixed and seated on the headrest 121 so that, even when the headrest 121 is pivotally rotated downward with respect to the backrest 111, the back of the user's head cannot be deviated from the headrest 121 and thus, the traction effect of the cervical vertebrae can be maximized.

The pivot rotating portion 130 as a unit which is configured at the connection part of the back support 110 and the head support 120, allows the head support 120 to be pivotally rotated downward with respect to the back support 110 while drawing a fan-shaped arc so that the lower cervical vertebrae (6th to 7th) are supported by the lower cervical support 114 and the upper cervical vertebrae (1st to 2nd) are supported by the upper cervical support 124 and thus the cervical vertebrae are pulled through a movement in which the back of the user's head is tilted toward the floor, includes rotating hinges 131 which are formed in a mutually facing structure on lower surfaces of the lower cervical support 114 and the upper cervical support 124 facing each other, and a connection pin 132 which connects the rotating hinges 131.

Thus, according to the pivot rotating portion 130, when the cervical airbag 210 positioned between the first cervical airbag seating groove 119 of the lower cervical support 114 and the second cervical airbag seating groove 128 of the upper cervical support 124 expands, the upper cervical support 124 can be pivotally rotated downward with respect to the lower cervical support 114, and thus, the user's cervical vertebrae can be pulled and corrected.

The return portion 140 as a unit which is configured at the connection part of the back support 110 and the head support 120 and allows the head support 120 pivotally rotated with respect to the back support 110 to be returned to it's original position, includes leaf spring installation sections 141 respectively formed on bottom surfaces of the lower cervical support 114 and the upper cervical support 124 facing each other, and leaf springs 142 which are installed on the leaf spring installation sections 141 and allow the upper cervical support 124 to be pivotally rotated upward with respect to the lower cervical support 114 when the cervical airbag 210 is contracted.

Thus, according to the return portion 140, when the cervical airbag 210 positioned between the first cervical airbag seating groove 119 of the lower cervical support 114 and the second cervical airbag seating groove 128 of the upper cervical support 124 is contracted, the upper cervical support 124 can be pivotally rotated upward with respect to the lower cervical support 114, and thus, the user's cervical traction distance and angle can be adjusted.

Hereinafter, the function of the cervical vertebra and thoracic vertebra traction structure according to an embodiment of the present invention will be described as follows.

First, as the user's back part is seated on the backrest 111 of the back support 110 and the back of the user's head is seated on the headrest 121 of the head support 120, the back of the user's neck is seated on the lower cervical support 114 and the upper cervical support 124 corresponding to the connection part of the backrest 111 and the headrest 121 so that the cervical vertebra is curved with a C-shaped curve, and in this case, the user's thoracic vertebra is also maintained by the backrest 111 in a curved state with a C-shaped curve.

Subsequently, when the cervical airbag 210 configured between the backrest 111 and the headrest 121 expands, as the headrest 121 is pivotally rotated downward with respect to the backrest 111, the upper cervical support 124 is rotated downward from the upper part of the lower cervical support 114 while drawing a fan-shaped arc. Thus, the lower cervical vertebrae (6th to 7th) are supported by the lower cervical support 114, and the upper cervical vertebrae (1st and 2nd) are supported by the upper cervical support 124 and thus, the cervical vertebrae can be pulled and corrected through a movement in which the back of the user's head is tilted toward the floor.

In this case, when the thoracic airbag 310 configured in the backrest 111 expands, the user's chest seated on the backrest 111 is fully tilted toward the floor, and the thoracic vertebrae are pulled and corrected. Thus, as the thoracic vertebrae are fully relaxed, the cervical relaxation effect can be maximized, and the spinal correction effect can also be maximized.

Subsequently, when the cervical airbag 210 is contracted, the headrest 121 is pivotally rotated upward with respect to the backrest 111 and is returned, the user's cervical traction distance and angle can be adjusted, and usability can be enhanced.

Meanwhile, as illustrated in FIGS. 1 through 10, a cervical vertebra and thoracic vertebra correcting apparatus according to an embodiment includes the cervical vertebra and thoracic vertebra traction structure 100 including the back support 110 on which a user's back part is seated and which allows the user's thoracic vertebra and cervical vertebra to be supported, the head support 120 on which the back of the user's head is seated and which allows the user's cervical vertebra to be supported, the pivot rotating portion 130 which is configured at the connection part of the back support 110 and the head support 120, allows the head support 120 to be pivotally rotated downward with respect to the back support 110 while drawing a fan-shaped arc so that, when the back of the user's neck is seated at the connection part of the back support 110 and the head support 120, the lower cervical vertebrae (6th to 7th) are supported by the back support 110 and the upper cervical vertebrae (1st to 2nd) are supported by the head support 120 and thus the cervical vertebrae are pulled through a movement in which the back of the user's head is tilted toward the floor, and the return portion 140 which is configured at the connection part of the back support 110 and the head support 120 and allows the head support 120 pivotally rotated with respect to the back support 110 to be returned to it's original position, a cervical traction unit 200 which is configured between the back support 110 and the head support 120 and allows the head support 120 to be pivotally rotated downward with respect to the back support 110 through the pivot rotating portion 130 so that the user's cervical part can be pulled, and a thoracic traction unit 300 which is configured in the back support 110, presses the user's back part seated on the back support 110, allows the user's chest to be tilted toward the floor so that the thoracic vertebrae can be pulled and the cervical traction effect through the cervical traction unit 200 can be maximized.

Here, the cervical vertebra and the thoracic vertebra traction structure 100 may have the above-described configuration and thus, detailed descriptions thereof will be omitted.

The cervical traction unit 200 as a unit which is configured between the back support 110 and the head support 120 and allows the head support 120 to be pivotally rotated downward with respect to the back support 110 through the pivot rotating portion 130 so that the user's cervical part can be pulled, may be configured in an electric, hydraulic or pneumatic manner at the facing portion between the lower cervical support 114 of the back support 110 and the upper cervical support 124 of the headrest 121.

The cervical traction unit 200 may include, more preferably, the cervical airbag 210 positioned between the first cervical airbag seating groove 119 of the backrest 111 and the second cervical airbag seating groove 128 of the headrest 121, and an air regulator which supplies air or discharges the supplied air through a host connected to the cervical airbag 210.

Thus, according to the cervical traction unit 200, the headrest 121 can be pivotally rotated downward with respect to the backrest 111. Thus, the lower cervical vertebrae (6th and 7th) are supported by the lower cervical support 114, and the upper cervical vertebrae (1st and 2nd) are supported by the upper cervical support 124 so that the back of the user's neck can be tilted backward and the cervical vertebrae can be pulled and corrected.

The thoracic traction unit 300 as a unit which is configured in the back support 110, presses the user's back part seated on the back support 110, allows the user's chest to be tilted toward the floor so that the thoracic vertebrae can be pulled and the cervical traction effect through the cervical traction unit 200 can be maximized, may be configured in an electric, hydraulic or pneumatic manner at the backrest 111.

The thoracic traction unit 300 may include, more preferably, a thoracic airbag 310 positioned in the thoracic airbag seating groove 116 of the backrest 111, and an air regulator which supplies air or discharges the supplied air through a host connected to the thoracic airbag 310.

Thus, according to the thoracic traction unit 300, in a state in which the thoracic vertebrae are pulled by the thoracic traction unit 200, the user's chest supported on the backrest 111 is tilted toward the floor so that the thoracic vertebrae can be pulled and the thoracic traction effect can be maximized.

Hereinafter, the function of the cervical vertebra and thoracic vertebra correcting apparatus according to an embodiment of the present invention will be described as follows.

First, as the user's back part is seated on the backrest 111 of the back support 110 of the cervical vertebra and thoracic vertebra structure 100 and the back of the user's head is seated on the headrest 121 of the head support 120, the back of the user's neck is seated on the lower cervical support 114 and the upper cervical support 124 corresponding to the connection part of the backrest 111 and the headrest 121 so that the thoracic vertebrae are curved (about 115 degrees) with a C-shaped curve. In this case, the user's thoracic vertebrae are also maintained by the backrest 111 in a curved state (about 110 degrees) with a C-shaped curve.

Subsequently, when the cervical airbag 210 of the cervical traction unit 200 configured between the backrest 111 and the headrest 121 expands, as the headrest 121 is pivotally rotated downward with respect to the backrest 111, the upper cervical support 124 is rotated downward from the upper part of the lower cervical support 114 while drawing a fan-shaped arc. Thus, the lower cervical vertebrae (6th and 7th) are supported by the lower cervical support 114, and the upper cervical vertebrae (1st and 2nd) are supported by the upper cervical support 124 so that the cervical vertebrae can be pulled and corrected through a movement in which the back of the user's head is tilted toward the floor.

In this case, when the thoracic airbag 310 of the thoracic airbag 300 configured in the backrest 111 expands, the user's chest seated on the backrest 111 is fully tilted toward the floor, and the thoracic vertebrae can be pulled and corrected. Thus, as the thoracic vertebrae are fully relaxed, the cervical relaxation effect can be maximized, and the spinal correction effect can be maximized.

Subsequently, when the cervical airbag 210 of the cervical traction unit 200 is contracted, as the headrest 121 is pivotally rotated upward with respect to the backrest 111 and is returned, the user's cervical traction distance and angle can be adjusted, and usability can be enhanced.

Thus, as described above, in a state in which the back part is supported by the back support 110 and the head part is supported by the head support 120, the head support 120 is pivotally rotated downward with respect to the back support 110 while drawing a fan-shaped arc so that the thoracic vertebrae and the thoracic vertebrae can be simultaneously pulled with a C-shaped curve, and the cervical vertebra and thoracic vertebra correcting effect can be maximized.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A traction apparatus comprising:

a back support including:

a first portion configured to support a thoracic region of a user's back, and a second portion extending from the first portion along a first longitudinal axis and configured to support a lower cervical region of the user's neck; and a head support including:

a third portion configured to support a back of the user's head, and a fourth portion extending from the third portion along the first longitudinal axis and configured to support an upper cervical region of the user's neck, wherein the head support is pivotally connected with the back support along an axis of rotation extending transverse to the first longitudinal axis and allows the head support to be pivotally rotated about the axis of rotation to increase a distance between the second portion of the back support and the fourth portion of the head support to apply a traction force between the lower cervical region and the upper cervical region.

2. The traction apparatus of claim 1, wherein the head support is biased relative to the back support to pivotally rotate about the axis of rotation to decrease the distance between the second portion of the back support and the fourth portion of the head support.

3. The traction apparatus of claim 2, wherein:

the second portion of the back support includes a first leaf spring installation section formed in a first terminal surface of the second portion of the back support that faces a second terminal surface of the fourth portion of the head support;

the fourth portion of the head support includes a second leaf spring installation section formed in the second terminal surface of the fourth portion of the head support; and a leaf spring interfacing with the first leaf spring installation section and the second leaf spring installation section, the leaf spring being configured to provide the biasing of the head support relative to the back support.

4. The traction apparatus of claim 1, wherein:

the first portion of the back support includes an upper surface configured to abut the thoracic region of the user's back and is sloped away from the second portion of the back support;

an upper surface of the second portion of the back support protrudes above the upper surface of the first portion of the back support and includes an arcuate depression configured to abut the lower cervical region of the user's neck.

5. The traction apparatus of claim 4, wherein the back support further comprises:

a thoracic airbag seating groove formed in the upper surface of the first portion of the back support and configured to support a thoracic airbag at least partially therein; and a first cervical airbag seating groove formed in a first terminal surface of the second portion of the back support that faces a second terminal surface of the fourth portion of the head support, the first cervical airbag seating groove being configured to support a cervical airbag at least partially therein.

6. The traction apparatus of claim 5, wherein:

the third portion of the head support includes an upper surface configured to abut the back of the user's head and is sloped away from the fourth portion of the head support; and an upper surface of the fourth portion of the head support protrudes above the upper surface of the third portion of the head support and includes an arcuate depression configured to abut the upper cervical region of the user's neck.

7. The traction apparatus of claim 6, wherein:

an upper surface of the fourth portion of the head support protrudes above an upper surface of the third portion of the head support and includes a first arcuate depression configured to abut the upper cervical region of the user's neck;

the upper surface of the third portion of the head support includes a second arcuate depression configured to abut the back of the user's head;

the third portion of the head support includes a first lower surface opposing the upper surface of the third portion;

the fourth portion of the head support includes a second lower surface opposing the upper surface of the fourth portion and stepped up from the first lower surface to form a stepped space recess such that the second lower surface is higher in elevation than the first lower surface;

the third portion of the head support further includes:

a first band fastening hole positioned adjacent to a first side of the second arcuate depression;

a second band fastening hole positioned adjacent to a second side of the second arcuate depression, the second side of the second arcuate depression opposing the first side of the second arcuate depression; and a band configured to interface with the first band fastening hole and the second band fastening hole, and to restrain the user's head against the third portion of the head support; and the fourth portion of the head support further includes a second cervical airbag seating groove formed in the second terminal surface of the fourth portion of the head support and configured to support the cervical airbag at least partially therein.

8. The traction apparatus of claim 1, wherein:

the second portion of the back support includes a first terminal surface that faces a second terminal surface of the fourth portion of the head support; and one of the first terminal surface and the second terminal surface includes a pin connection and the other of the first terminal surface and the second terminal surface includes a hinge configured to interface with the pin connection to pivotally connect the head support with the back support.

9. A cervical vertebra and thoracic vertebra correcting apparatus comprising:

the traction apparatus of any one of claims 1 through 7, 3, or 8;

a cervical traction unit arranged between the back support and the head support and configured to control pivotal rotation of the head support about the axis of rotation; and a thoracic traction unit arranged on the back support and configured to control tilting of the user's chest relative to the back support.

10. The cervical vertebra and thoracic vertebra correcting apparatus of claim 9, wherein the cervical traction unit comprises:

a cervical airbag positioned between the back support and the head support; and an air regulator configured to supply air to the cervical airbag and/or discharge air from the cervical airbag to control an amount of the pivotal rotation of the head support about the axis of rotation.

11. The cervical vertebra and thoracic vertebra correcting apparatus of claim 9, wherein the thoracic traction unit comprises:

a thoracic airbag positioned on the back support; and an air regulator configured to supply air to the thoracic airbag and/or discharge air from the thoracic airbag to control an amount of the tilting of the user's chest relative to the back support.

* * * * *